(12) United States Patent
Jiang

(10) Patent No.: US 12,477,575 B2
(45) Date of Patent: Nov. 18, 2025

(54) TRANSMISSION COLLISION RESOLVING METHOD AND APPARATUS, AND TERMINAL AND STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 719 days.

(21) Appl. No.: 17/774,137

(22) PCT Filed: Nov. 6, 2019

(86) PCT No.: PCT/CN2019/116006
§ 371 (c)(1),
(2) Date: May 3, 2022

(87) PCT Pub. No.: WO2021/087808
PCT Pub. Date: May 14, 2021

(65) Prior Publication Data
US 2022/0394764 A1 Dec. 8, 2022

(51) Int. Cl.
*H04W 74/0808* (2024.01)
(52) U.S. Cl.
CPC .............. *H04W 74/0808* (2013.01)
(58) Field of Classification Search
CPC .................. H04W 74/0808; H04W 16/14
USPC ........................................ 370/329
See application file for complete search history.

(56) References Cited

U.S. PATENT DOCUMENTS

| | | | |
|---|---|---|---|
| 2017/0006640 A1 | 1/2017 | Dinan | |
| 2017/0019909 A1 | 1/2017 | Si et al. | |
| 2017/0353972 A1* | 12/2017 | Babaei | H04W 76/20 |
| 2018/0279386 A1* | 9/2018 | Liu | H04W 74/0875 |

FOREIGN PATENT DOCUMENTS

| | | |
|---|---|---|
| CN | 104994591 A | 10/2015 |
| CN | 106559892 A | 4/2017 |
| CN | 109417800 A | 3/2019 |
| CN | 109804702 A | 5/2019 |
| CN | 109845383 A | 6/2019 |
| CN | 110149705 A | 8/2019 |

(Continued)

OTHER PUBLICATIONS

Nokia et al., "On UL transmissions during SMTC in NR-U," 3GPP TSG-RAN WG2, Meeting #106, R2-1906750, Reno, USA, May 13-17, 2019, (3p).

(Continued)

*Primary Examiner* — Hermon Asres
(74) *Attorney, Agent, or Firm* — Arch & Lake LLP; Hao Tan; Shen Wang

(57) ABSTRACT

Disclosed are a transmission collision resolving method, relating to the technical field of communications. The method comprises: when two uplink transmissions collide on a time domain, determining, from among the two uplink transmissions, a first uplink transmission with a higher priority and a second uplink transmission with a lower priority; performing first LBT on the first uplink transmission; and deciding, according to a first LBT result of the first uplink transmission, whether to perform the second uplink transmission.

14 Claims, 2 Drawing Sheets

(56) References Cited

FOREIGN PATENT DOCUMENTS

CN    110167188 A    8/2019
KR    20180018247 A    2/2018

OTHER PUBLICATIONS

HTC, "Discussion on overlapping of LBT procedures," 3GPP TSG-RAN WG1, Meeting #86, R1-167731, Gothenburg, Sweden, Aug. 22-26, 2016, (2p).
CNOA issued in Application No. 201980002924.6 dated Mar. 15, 2023 with English translation, (6p).
International Search Report of PCT/CN2019/116006 dated Jul. 27, 2020 with English translation, (4p).
MediaTek Inc., "Discussion on NR-U Configured Grant", 3GPP TSG RAN WG1 #96bis, R1-1904485, Xi'an China, Apr. 8-12, 2019, (6p).
First Office Action of Chinese Application No. 201980002924.6 dated Sep. 2, 2022 with English translation, (11p).

\* cited by examiner

TRANSMISSION COLLISION RESOLVING METHOD AND APPARATUS, AND TERMINAL AND STORAGE MEDIUM

CROSS REFERENCE

The present application is a U.S. National Stage of International Application No. PCT/CN2019/116006, filed on Nov. 6, 2019, the entire content of which is incorporated herein by reference for all purposes.

TECHNICAL FIELD

The present disclosure relates to the field of communication technologies, and in particular, to a transmission collision resolving method and apparatus, and a terminal and a storage medium.

BACKGROUND

The design of 5G New Radio License (NR-U) should comply with relevant regulations in major regions of the world, including requirements for Listen Before Talk (LBT). That is, before sending data, the communication device needs to monitor whether there are other communication devices sending data on the unlicensed spectrum channel. If other communication devices are sending data, it will delay sending its own data to the terminal.

The user equipment (UE) may have a situation where a plurality of uplink transmissions collide (overlap). When two uplink transmissions collide, the UE will preferentially choose to send an uplink transmission with a higher priority.

SUMMARY

The examples of the present disclosure provide a transmission collision resolving method, and a terminal and a storage medium. The technical solution is as follows.

According to an aspect of the present disclosure, there is provided a transmission collision resolving method, including:
  determining a first uplink transmission with a higher priority and a second uplink transmission with a lower priority among two uplink transmissions, in response to determining that the two uplink transmissions collide on a time domain;
  prioritizing a first listen-before-talk (LBT) on the first uplink transmission; and
  determining whether to perform the second uplink transmission according to a first LBT result of the first uplink transmission.

According to another aspect of the present disclosure, there is provided a terminal, including:
  a processor;
  a transceiver connected to the processor; and
  a memory for storing instructions executable by the processor,
  wherein, the processor is configured to load and execute the executable instructions to implement the transmission collision resolving methods described above.

According to another aspect of the present disclosure, there is provided a non-transitory computer-readable storage medium, wherein executable instructions are stored in the readable storage medium, and the executable instructions are loaded and executed by a processor to implement the transmission collision resolving methods described above.

BRIEF DESCRIPTION OF THE DRAWINGS

The following briefly introduces the accompanying drawings used in the description of the examples. The accompanying drawings in the following description are only some examples of the present disclosure. For those of ordinary skill in the art, other drawings can also be obtained from these drawings without creative effort.

DETAILED DESCRIPTION

Figure 1:
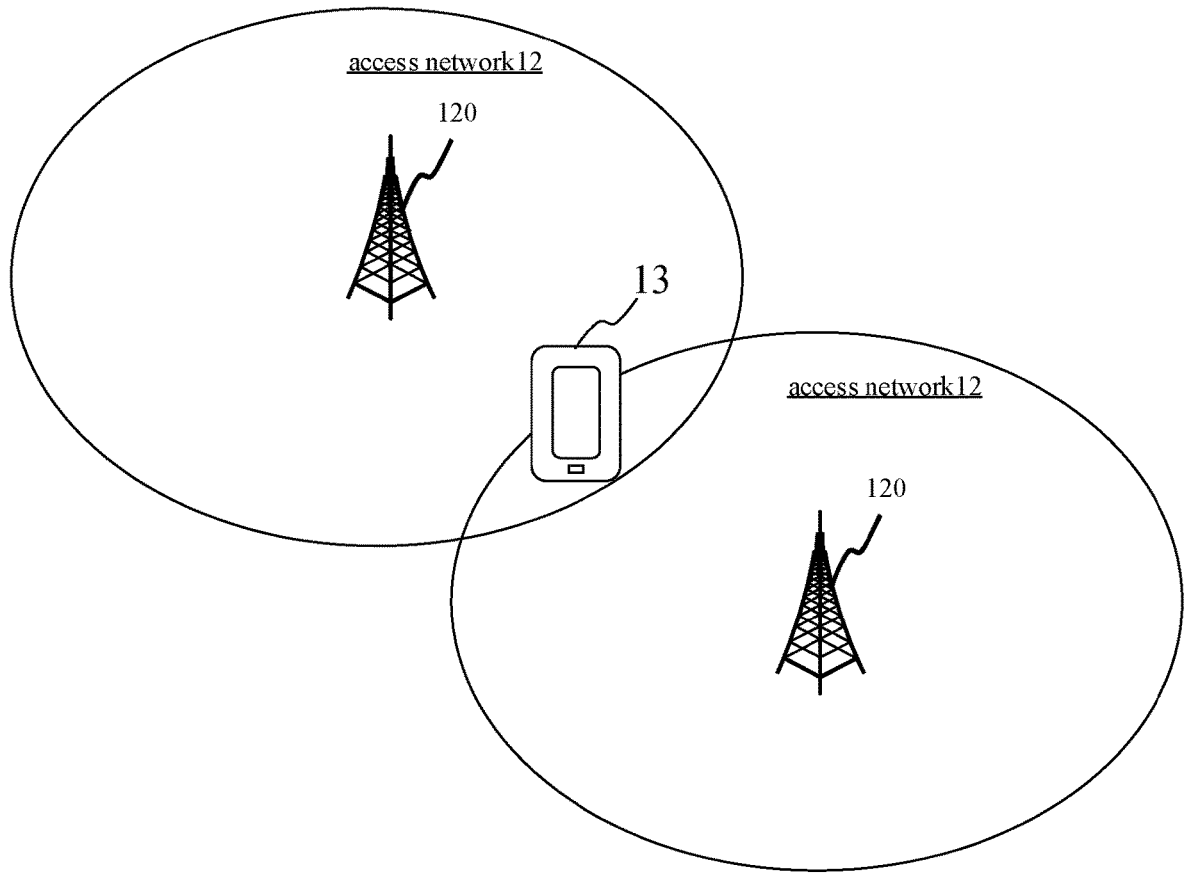
FIG. 1 is a block diagram of a communication system provided by an illustrative example of the present disclosure.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

First, before the detailed introduction of the transmission collision resolving method provided by the examples of the present disclosure, the terms and implementation environments involved in the examples of the present disclosure are briefly introduced.

Unlicensed spectrum: it is the frequency spectrum allocated by countries and regions that can be used for radio equipment communication. This frequency spectrum is usually considered to be shared spectrum. That is, as long as the communication devices in different communication systems meet the regulatory requirements set by the countries or regions on the spectrum, the spectrum can be used, without the need to apply for an exclusive spectrum license from the government.

FIG. 1 shows a block diagram of a communication system provided by an illustrative example of the present disclosure. The communication system may work on an unlicensed spectrum. The communication system may include an access network 12 and a terminal 13.

The access network 12 includes several access network devices 120. The access network device 120 may be a base station, and the base station is a device deployed in an access network to provide a wireless communication function for a terminal. The base station may include various forms of macro base stations, micro base stations, relay stations, access points and so on. In the 5G NR-U system, the device with the base station function is called gNodeB or gNB. As communication technology evolves, the description of "base station" may change.

The terminal 13 may include various handheld devices, vehicle-mounted devices, wearable devices, computing devices with wireless communication functions or other processing devices connected to the wireless modem, as well as various forms of user equipment, mobile stations (MS), terminal devices and so on. For the convenience of description, the devices mentioned above are collectively referred to as terminals. The access network device 120 and the terminal 13 communicate with each other through a certain air interface technology, such as a Uu interface.

It should be noted that the following illustrative examples of the present disclosure only take a terminal accessing an access network device as an example for illustration. After understanding the technical solutions of the present disclosure, those skilled in the art will easily think of the case where other terminals access other access network devices. These extended solutions should be included in the protection scope of the present disclosure.

Figure 2:
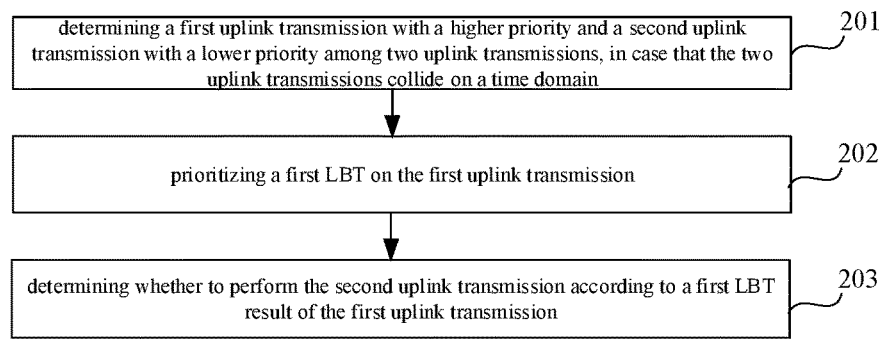
FIG. 2 is a flowchart of a transmission collision resolving method provided by an illustrative example of the present disclosure.

FIG. 2 is a flowchart of a transmission collision resolving method provided by an illustrative example of the present disclosure. The method can be applied to a terminal in an unlicensed spectrum NR-U system, and the method includes following steps.

Step 201, a first uplink transmission with a higher priority and a second uplink transmission with a lower priority among two uplink transmissions are determined in case that the two uplink transmissions collide on a time domain.

For example, the two uplink transmissions that collide include:
a first physical uplink shared channel (PUSCH) and a first physical uplink control channel (PUCCH);
or, the first PUSCH and a second PUSCH;
or, a first dynamic scheduling and a second dynamic scheduling;
or, the first dynamic scheduling and a first semi-static scheduling;
or, the first semi-persistent scheduling (Configured Grant, CG) and a second semi-persistent scheduling;
or, a random access channel and the first PUSCH;
or, the random access channel and the first PUCCH.

The first PUCCH includes but not limited to, Scheduling Request (SR), Acknowledgment Feedback (ACK), Negative Feedback (NACK), Channel-Slate Information (CSI), and Sounding Reference Signal (SRS).

Step 202, a first listen-before-talk (LBT) is preferentially performed on the first uplink transmission.

Step 203, it is determined whether to perform the second uplink transmission according to a first LBT result of the first uplink transmission.

To sum up, in the method provided in an example, by determining whether to perform the second uplink transmission according to the first LBT result of the first uplink transmission, the terminal can decide to cancel or continue the second uplink transmission according to the first LBT result. For example, when the first LBT result indicates failure, the second uplink transmission is continued, which may increase the transmission success rate of the second uplink transmission with a lower priority in certain scenarios.

Figure 3:
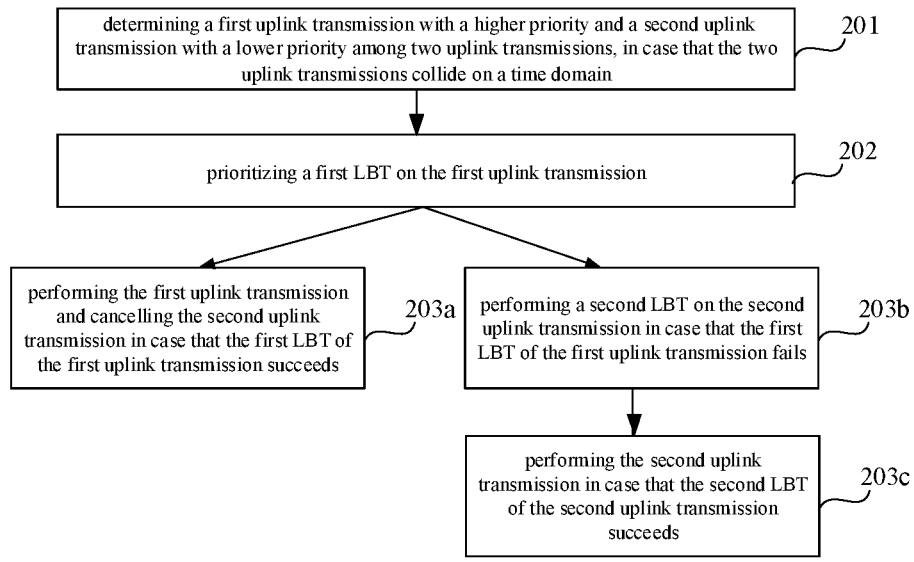
FIG. 3 is a flowchart of a transmission collision resolving method provided by an illustrative example of the present disclosure.

FIG. 3 is a flowchart of a transmission collision resolving method provided by an illustrative example of the present disclosure. The method can be applied to a terminal in an unlicensed spectrum NR-U system, where a medium access control (MAC) layer and a physical layer are set in the terminal. The above-mentioned step 203 can be alternatively implemented as at least one of the steps 203a to 203c, and the method includes following steps.

Step 201, a first uplink transmission with a higher priority and a second uplink transmission with a lower priority among two uplink transmissions are determined in case that the two uplink transmissions collide on a time domain.

The MAC layer generates a first Medium Access Control Protocol Data Unit (MAC PDU) corresponding to the first uplink transmission and a second MAC PDU corresponding to the second uplink transmission, and submits them to the physical layer.

Alternatively, if the first MAC PDU has not been generated, the MAC layer generates the first MAC PDU; if the second MAC PDU has not been generated, the MAC layer generates the second MAC PDU.

The MAC layer indicates the priorities of the two uplink transmissions to the physical layer. The physical layer determines a first uplink transmission with a higher priority and a second uplink transmission with a lower priority according to the priorities of the two uplink transmissions.

Step 202, a first listen-before-talk (LBT) is preferentially performed on the first uplink transmission.

The physical layer preferentially performs the first LBT on the first uplink transmission. The physical layer indicates the first LBT result of the first uplink transmission to the MAC layer. The MAC layer determines whether to perform the second uplink transmission according to the first LBT result of the first uplink transmission.

Step 203*a*, the first uplink transmission is performed and the second uplink transmission is canceled in case that the first LBT of the first uplink transmission succeeds.

Alternatively, if the first LBT of the first uplink transmission succeeds, the MAC layer instructs the physical layer to perform the first uplink transmission.

Alternatively, canceling the second uplink transmission includes: if the second MAC PDU of the second uplink transmission has not been generated, the MAC layer does not generate the second MAC PDU; or, if the second MAC PDU of the second uplink transmission has been generated by the MAC layer, the physical layer cancels sending of the second MAC PDU.

Step 203*b*, if the first LBT of the first uplink transmission fails, a second LBT is performed on the second uplink transmission.

When the first LBT fails, the physical layer performs a second LBT on the second uplink transmission. The physical layer indicates the second LBT result of the second uplink transmission to the MAC layer. The MAC layer determines whether to perform the second uplink transmission according to the second LBT result of the second uplink transmission.

Step 203*c*, if the second LBT of the second uplink transmission succeeds, the second uplink transmission is performed.

If the second LBT of the second uplink transmission succeeds, the MAC layer instructs the physical layer to perform the second uplink transmission.

To sum up, in the method provided in an example, by determining whether to perform the second uplink transmission according to the first LBT result of the first uplink transmission, the terminal can decide to cancel or continue the second uplink transmission according to the first LBT result. For example, when the first LBT result indicates failure, the second uplink transmission is continued, which may increase the transmission success rate of the second uplink transmission with a lower priority in certain scenarios.

In alternative examples based on FIG. 2 or FIG. 3, the relationship between the initial transmission times of the first uplink transmission and the second uplink transmission also needs to be considered. For example, the method further includes following steps.

The terminal performs said determining whether to perform the second uplink transmission according to a first LBT result of the first uplink transmission, in case that an initial transmission time t1 of the first uplink transmission is before an initial transmission time t2 of the second uplink transmission.

Alternatively, the terminal performs said determining whether to perform the second uplink transmission according to a first LBT result of the first uplink transmission, in case that an initial transmission time t1 of the first uplink transmission is before an initial transmission time t2 of the second uplink transmission, and t2−t1 is smaller than a first threshold d1.

The above-mentioned first threshold d1 may be predefined by a communication protocol, or the above-mentioned first threshold d1 may be configured by a network-side device. In an example, the first threshold d1 may be one, two or four Orthogonal frequency-division multiplexing symbols (OFDM Symbol).

In alternative examples based on FIG. 2 or FIG. 3, the relationship between the initial transmission times of the first uplink transmission and the second uplink transmission also needs to be considered. For example, the method further includes following steps.

The terminal cancels the second uplink transmission in case that an initial transmission time t1 of the first uplink transmission is after an initial transmission time t2 of the second uplink transmission.

Alternatively, the terminal cancels the second uplink transmission in case that an initial transmission time t1 of the first uplink transmission is after an initial transmission time t2 of the second uplink transmission, and t1−t2 is greater than a second threshold d2.

The above-mentioned second threshold d1 may be predefined by a communication protocol, or, the above-mentioned second threshold d1 is configured by a network-side device. In an example, the second threshold d2 may be one, two or four OFDM Symbols.

To sum up, in the method provided in this example, the terminal determines whether to perform the second uplink transmission according to the first LBT result of the first uplink transmission when the difference value of the initial transmission times between two uplink transmissions is small (and the first uplink transmission with a higher priority comes first), otherwise, the second uplink transmission is directly canceled, which avoids the redundant judgment or determination caused by the lack of time to perform the second LBT when the difference value of the initial transmission times between two uplink transmissions is large (and the second uplink transmission with a lower priority comes first), which can prevent the terminal from performing an unnecessary calculation process, thereby achieving the effect of power saving.

Figure 4:
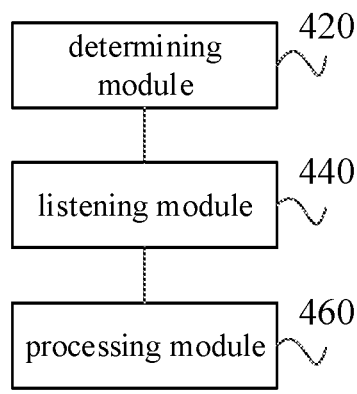
FIG. 4 is a block diagram of a transmission collision resolving apparatus provided by an illustrative example of the present disclosure.

FIG. 4 shows a transmission collision resolving apparatus provided by an illustrative example of the present disclosure. The apparatus includes:

a determining module 420 configured to determine a first uplink transmission with a higher priority and a second uplink transmission with a lower priority among two uplink transmissions, in case that the two uplink transmissions collide on a time domain;

a listening module 440 configured to prioritize a first listen-before-talk (LBT) on the first uplink transmission; and a processing module 460 configured to determine whether to perform the second uplink transmission according to a first LBT result of the first uplink transmission.

In an alternative example, the processing module 460 is configured to perform the first uplink transmission and cancel the second uplink transmission in case that the first LBT of the first uplink transmission succeeds.

In an alternative example, the processing module 460 is configured to: perform a second LBT on the second uplink transmission in case that the first LBT of the first uplink transmission fails; perform the second uplink transmission in case that the second LBT of the second uplink transmission succeeds.

In an alternative example, the processing module 460 is configured to perform said determining whether to perform the second uplink transmission according to a first LBT result of the first uplink transmission, in case that an initial transmission time t1 of the first uplink transmission is before an initial transmission time t2 of the second uplink transmission.

In an alternative example, the processing module 460 is configured to perform said determining whether to perform the second uplink transmission according to a first LBT result of the first uplink transmission, in case that an initial transmission time t1 of the first uplink transmission is before an initial transmission time t2 of the second uplink transmission, and t2−t1 is smaller than a first threshold d1.

In an alternative example, the apparatus further includes:
a canceling module configured to cancel the second uplink transmission in case that an initial transmission time t1 of the first uplink transmission is after an initial transmission time t2 of the second uplink transmission.

In an alternative example, the apparatus further includes:
a canceling module configured to cancel the second uplink transmission in case that an initial transmission time t1 of the first uplink transmission is after an initial transmission time t2 of the second uplink transmission, and t1−t2 is greater than a second threshold d2.

In an alternative example, the apparatus is provided with a medium access control (MAC) layer and a physical layer, and apparatus further includes:
a generating module, configured to generate, by the MAC layer, a first Medium Access Control Protocol Data Unit (MAC PDU) corresponding to the first uplink transmission, and a second MAC PDU corresponding to the second uplink transmission, and submit them to the physical layer.

In an alternative example, the apparatus is provided with a medium access control (MAC) layer and a physical layer,
the determining module is configured to indicate priorities of the two uplink transmissions to the physical layer through the MAC layer; determine the first uplink transmission with a higher priority and the second uplink transmission with a lower priority through the physical layer according to the priorities of the two uplink transmissions.

In an alternative example, the apparatus is provided with a medium access control (MAC) layer and a physical layer,
the processing module 460 is configured to indicate the first LBT result of the first uplink transmission to the MAC layer through the physical layer; determine whether to perform the second uplink transmission through the MAC layer according to the first LBT result of the first uplink transmission.

In an alternative example, the apparatus is provided with a medium access control (MAC) layer,
the canceling module is configured to control the MAC layer not to generate a second MAC PDU in case that the second MAC PDU of the second uplink transmission has not been generated.

In an alternative example, the apparatus is provided with a medium access control (MAC) layer and a physical layer,
the canceling module is configured to control the physical layer to cancel sending of a second MAC PDU, in case that the second MAC PDU of the second uplink transmission has been generated by the MAC layer.

In an alternative example, the two uplink transmissions include:
a first physical uplink shared channel (PUSCH) and a first physical uplink control channel (PUCCH);
or, the first PUSCH and a second PUSCH;
or, a first dynamic scheduling and a second dynamic scheduling;
or, the first dynamic scheduling and a first semi-static scheduling;
or, the first semi-persistent scheduling and a second semi-persistent scheduling;
or, a random access channel and the first PUSCH;
or, the random access channel and the first PUCCH.

Figure 5:
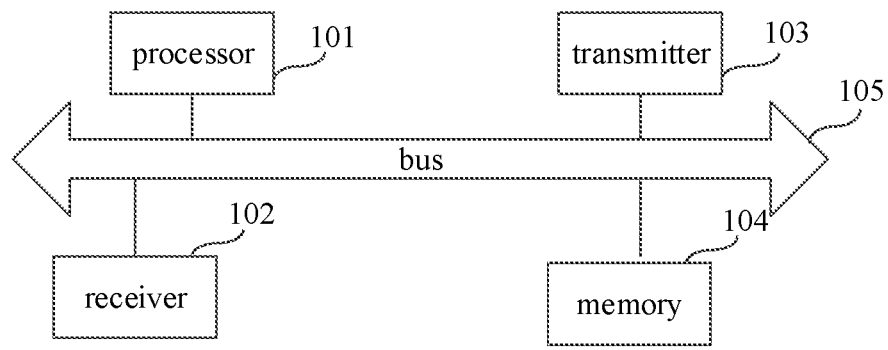
FIG. 5 is a block diagram of a communication device provided by an illustrative example of the present disclosure.

FIG. 5 shows a schematic structural diagram of a terminal provided by an illustrative example of the present disclosure. The terminal includes: a processor 101, a receiver 102, a transmitter 103, a memory 104, and a bus 105.

The processor 101 includes one or more processing cores. The processor 101 executes various functional applications and information processing by running software programs and modules.

The receiver 102 and the transmitter 103 may be implemented as a communication component, which may be a communication chip.

The memory 104 is connected to the processor 101 through the bus 105.

The memory 104 may be configured to store at least one instruction. The processor 101 may be configured to execute the at least one instruction, so as to implement various steps in the foregoing method examples.

Additionally, the memory 104 may be implemented by any type of volatile or non-volatile storage devices including, but not limited to, magnetic or optical disks, electrically erasable programmable Read Only Memory (EEPROM), Erasable Programmable Read Only Memory (EPROM), Static Anytime Access Memory (SRAM), Read Only Memory (ROM), Magnetic Memory, Flash Memory, Programmable Read Only Memory (PROM), or a combination thereof.

In an illustrative example, a computer-readable storage medium is also provided. The computer-readable storage medium stores at least one instruction, at least one piece of program, code set or instruction set. The at least one instruction, the at least one piece of program, the code set or the instruction set is loaded and executed by the processor to implement the transmission collision resolving method provided by each of the above method examples.

Those of ordinary skill in the art can understand that all or part of the steps of implementing the above examples can be completed by hardware, or can be completed by instructing relevant hardware through a program, and the program can be stored in a computer-readable storage medium. The storage medium mentioned above may be a read-only memory, a magnetic disk or an optical disk, etc.

The above are only alternative examples of the present disclosure, and are not intended to limit the present disclosure. Any modifications, equivalent replacements, improvements, etc. made within the spirit and principles of the present disclosure shall be included within the protection scope of the present disclosure.

What is claimed is:

1. A transmission collision resolving method, comprising:
determining, by a terminal, a first uplink transmission with a higher priority and a second uplink transmission with a lower priority among two uplink transmissions, in response to determining that the two uplink transmissions collide on a time domain;
prioritizing, by the terminal, a first listen-before-talk (LBT) on the first uplink transmission; and
determining whether to perform the second uplink transmission according to a first LBT result of the first uplink transmission,
wherein the two uplink transmissions comprise:
a first physical uplink shared channel (PUSCH) and a first physical uplink control channel (PUCCH); or
the first PUSCH and a second PUSCH; or
a first dynamic scheduling and a second dynamic scheduling; or
the first dynamic scheduling and a first semi-static scheduling; or
the first semi-persistent scheduling and a second semi-persistent scheduling; or a random access channel and the first PUSCH; or the random access channel and the first PUCCH.

2. The method according to claim 1, wherein determining whether to perform the second uplink transmission according to the first LBT result of the first uplink transmission comprises:

performing the first uplink transmission and cancelling the second uplink transmission in response to determining that the first LBT of the first uplink transmission succeeds.

3. The method according to claim 1, wherein determining whether to perform the second uplink transmission according to the first LBT result of the first uplink transmission comprises:

performing a second LBT on the second uplink transmission in response to determining that the first LBT of the first uplink transmission fails;

performing the second uplink transmission in response to determining that the second LBT of the second uplink transmission succeeds.

4. The method according to f claim 1, further comprising:

determining whether to perform the second uplink transmission according to the first LBT result of the first uplink transmission, in response to determining that an initial transmission time t1 of the first uplink transmission is before an initial transmission time t2 of the second uplink transmission.

5. The method according to claim 1, further comprising:

determining whether to perform the second uplink transmission according to the first LBT result of the first uplink transmission, in response to determining that an initial transmission time t1 of the first uplink transmission is before an initial transmission time t2 of the second uplink transmission, and t2−t1 is smaller than a first threshold d1.

6. The method according to claim 1, further comprising:

cancelling the second uplink transmission in response to determining that an initial transmission time t1 of the first uplink transmission is after an initial transmission time t2 of the second uplink transmission.

7. The method according to claim 1, further comprising:

cancelling the second uplink transmission in response to determining that an initial transmission time t1 of the first uplink transmission is after an initial transmission time t2 of the second uplink transmission, and t1−t2 is greater than a second threshold d2.

8. The method according to claim 1, wherein the method is applied in the terminal, and the terminal comprises a medium access control (MAC) layer and a physical layer, and the method further comprises:

generating, by the MAC layer, a first Medium Access Control Protocol Data Unit (MAC PDU) corresponding to the first uplink transmission, and a second MAC PDU corresponding to the second uplink transmission, and submitting, by the MAC layer, the first MAC PDU and the second MAC PDU to the physical layer.

9. The method according to claim 1, wherein the method is applied in the terminal, and the terminal comprises a medium access control (MAC) layer and a physical layer, and wherein determining the first uplink transmission with a higher priority and the second uplink transmission with a lower priority among the two uplink transmissions comprises:

indicating, by the MAC layer, priorities of the two uplink transmissions to the physical layer;

determining, by the physical layer, the first uplink transmission with a higher priority and the second uplink transmission with a lower priority according to the priorities of the two uplink transmissions.

10. The method according to claim 1, wherein the method is applied in the terminal, and the terminal comprises a medium access control (MAC) layer and a physical layer, and determining whether to perform the second uplink transmission according to a first LBT result of the first uplink transmission comprises:

indicating, by the physical layer, the first LBT result of the first uplink transmission to the MAC layer;

determining, by the MAC layer, whether to perform the second uplink transmission according to the first LBT result of the first uplink transmission.

11. The method according to claim 7, wherein the method is applied in the terminal, and the terminal comprises a medium access control (MAC) layer, and cancelling the second uplink transmission comprises:

not generating, by the MAC layer, a second MAC PDU in response to determining that the second MAC PDU of the second uplink transmission has not been generated.

12. The method according to claim 7, wherein the method is applied in the terminal, and the terminal comprises a medium access control (MAC) layer and a physical layer, and cancelling the second uplink transmission comprises:

cancelling, by the physical layer, sending of a second MAC PDU, in response to determining that the second MAC PDU of the second uplink transmission has been generated by the MAC layer.

13. A terminal, comprising:

a processor;

a transceiver connected to the processor; and a memory for storing instructions executable by the processor, wherein, the processor is configured to load and execute the executable instructions to:

determine a first uplink transmission with a higher priority and a second uplink transmission with a lower priority among two uplink transmissions, in response to determining that the two uplink transmissions collide on a time domain;

prioritize a first listen-before-talk (LBT) on the first uplink transmission; and determine whether to perform the second uplink transmission according to a first LBT result of the first uplink transmission, wherein the two uplink transmissions comprise:

a first physical uplink shared channel (PUSCH) and a first physical uplink control channel (PUCCH); or the first PUSCH and a second PUSCH; or a first dynamic scheduling and a second dynamic scheduling; or the first dynamic scheduling and a first semi-static scheduling; or the first semi-persistent scheduling and a second semi-persistent scheduling; or a random access channel and the first PUSCH; or the random access channel and the first PUCCH.

14. A non-transitory computer-readable storage medium, wherein executable instructions are stored in the readable storage medium, and the executable instructions are loaded and executed by a processor to implement:

determining a first uplink transmission with a higher priority and a second uplink transmission with a lower priority among two uplink transmissions, in response to determining that the two uplink transmissions collide on a time domain;
prioritizing a first listen-before-talk (LBT) on the first uplink transmission; and
determining whether to perform the second uplink transmission according to a first LBT result of the first uplink transmission,
wherein the two uplink transmissions comprise:
a first physical uplink shared channel (PUSCH) and a first physical uplink control channel (PUCCH); or
the first PUSCH and a second PUSCH; or
a first dynamic scheduling and a second dynamic scheduling; or
the first dynamic scheduling and a first semi-static scheduling; or
the first semi-persistent scheduling and a second semi-persistent scheduling; or
a random access channel and the first PUSCH; or
the random access channel and the first PUCCH.

* * * * *